United States Patent
Lee et al.

(10) Patent No.: US 7,679,900 B2
(45) Date of Patent: Mar. 16, 2010

(54) COMPUTER ENCLOSURE

(75) Inventors: Sheng-Hung Lee, Taipei Hsien (TW);
Lung-Sheng Tsai, Taipei Hsien (TW);
Chia-Kang Wu, Taipei Hsien (TW);
Ho-Chin Tsai, Taipei Hsien (TW);
Yi-Lung Chou, Taipei Hsien (TW);
Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/210,510

(22) Filed: Sep. 15, 2008

(65) Prior Publication Data

US 2010/0002369 A1 Jan. 7, 2010

(30) Foreign Application Priority Data

Jul. 3, 2008 (CN) ........................ 2008 2 0301430

(51) Int. Cl.
*G06F 1/16* (2006.01)
(52) U.S. Cl. ................ 361/679.39; 361/725; 312/223.1
(58) Field of Classification Search ............ 361/679.37, 361/724, 725
See application file for complete search history.

(56) References Cited

U.S. PATENT DOCUMENTS

| | | | | |
|---|---|---|---|---|
| 5,229,924 A | * | 7/1993 | Zell | 361/796 |
| 5,571,256 A | * | 11/1996 | Good et al. | 211/26 |
| 5,737,193 A | * | 4/1998 | LaRiviere et al. | 361/799 |
| 6,075,698 A | * | 6/2000 | Hogan et al. | 361/695 |
| 6,404,642 B1 | * | 6/2002 | Greenfield et al. | 361/727 |
| 6,447,082 B1 | * | 9/2002 | Haag et al. | 312/263 |
| 2002/0181197 A1 | * | 12/2002 | Huang | 361/685 |
| 2005/0068755 A1 | * | 3/2005 | Beihoff et al. | 361/788 |
| 2006/0250766 A1 | * | 11/2006 | Blaalid et al. | 361/685 |
| 2007/0247818 A1 | * | 10/2007 | Canfield et al. | 361/728 |

* cited by examiner

*Primary Examiner*—Jayprakash N Gandhi
*Assistant Examiner*—Anthony Q Edwards
(74) *Attorney, Agent, or Firm*—Clifford O. Chi

(57) ABSTRACT

A computer enclosure for mounting a disk drive bracket includes a chassis for receiving the disk drive bracket, and an extending plate releasably positioned and aligned at an end of the chassis. One portion of the disk drive bracket is fixed on the chassis, and the other portion is fixed on the extending plate. The disk drive bracket is completely mounted on the chassis and the extending plate.

15 Claims, 3 Drawing Sheets

COMPUTER ENCLOSURE

BACKGROUND

1. Technical Field

The present invention relates to a computer enclosure, particularly to a computer enclosure having different disk drive brackets therein.

2. Description of Related Art

Generally, when a conventional computer is assembled, at least one disk drive bracket is mounted in a computer enclosure. Data storage devices such as a hard disk drive, a floppy disk drive, and a compact disc drive are then attached to the drive bracket.

However, each computer enclosure has a special fixing means for the disk drive bracket. Thus, it is difficult to use a computer enclosure mounting different disk drive brackets therein.

Therefore, a computer enclosure is desired to overcome the above-described shortcoming.

DETAILED DESCRIPTION OF THE EMBODIMENTS

Figure 1:
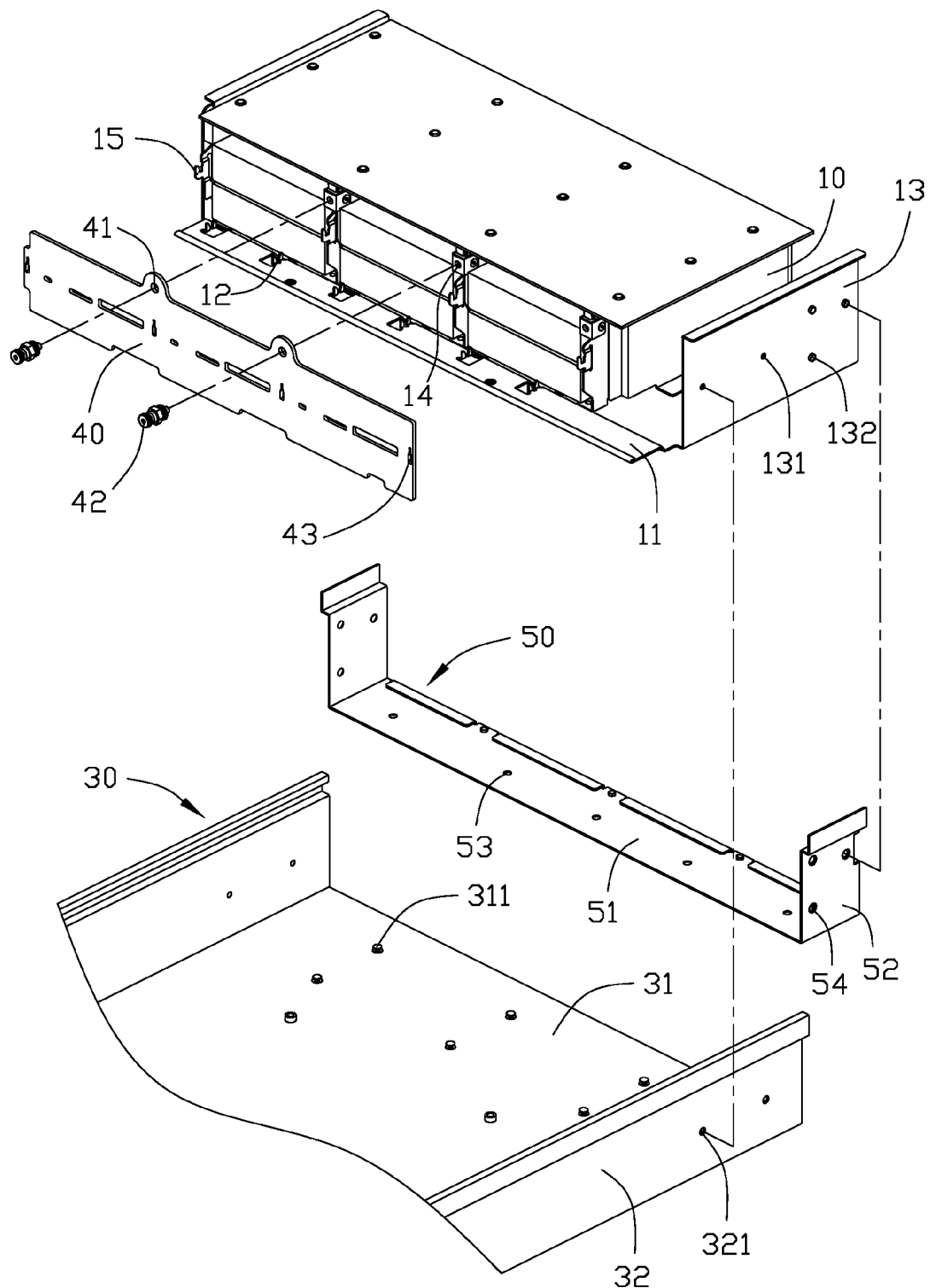
FIG. 1 is an isometric, exploded view of a first embodiment of a computer enclosure.

Referring to FIG. 1, a computer enclosure includes a disk drive bracket 10, a chassis 30, and an extending plate 50.

The disk drive bracket 10 includes a bottom panel 11 and a pair of parallel side panels 13 extending from opposite sides of the bottom panel 11. A plurality of grooves 12 is defined in a front portion of the bottom panel 11. Two holes 131 are defined in each sidewall 13. In one embodiment, three rivets 132 are formed on each sidewall adjacent to the holes 131. A plurality of holes 14 and a plurality of hooks 15 are formed on the disk drive bracket 10 for fixing a printed circuit board 40. The printed circuit board 40 has screws 42, and a plurality of holes 41 and slots 43 defined therein.

The chassis 30 includes a bottom wall 31 and a pair of parallel sidewalls 32 perpendicularly extending from opposite sides of the bottom wall 31. A plurality of protrusions 311 are formed on the bottom wall 31 for mounting the disk drive bracket 10. Two holes 321 are defined in each sidewall 32 corresponding to the holes 131 of each side panel 13.

The extending plate 50 includes a bottom plate 51 and a pair of parallel side plates 52 perpendicularly extending from opposite sides of the bottom plate 51. A height of the side plates 52 is substantially equal to a height of the sidewalls 32 of the chassis 30. A plurality of recesses 53 are defined in the bottom plate 51. Three holes 54 are defined in each side plate 52 corresponding to the rivets 132. A thickness of the extending plate 50 is substantially equal to a thickness of the chassis 30.

Figure 2:
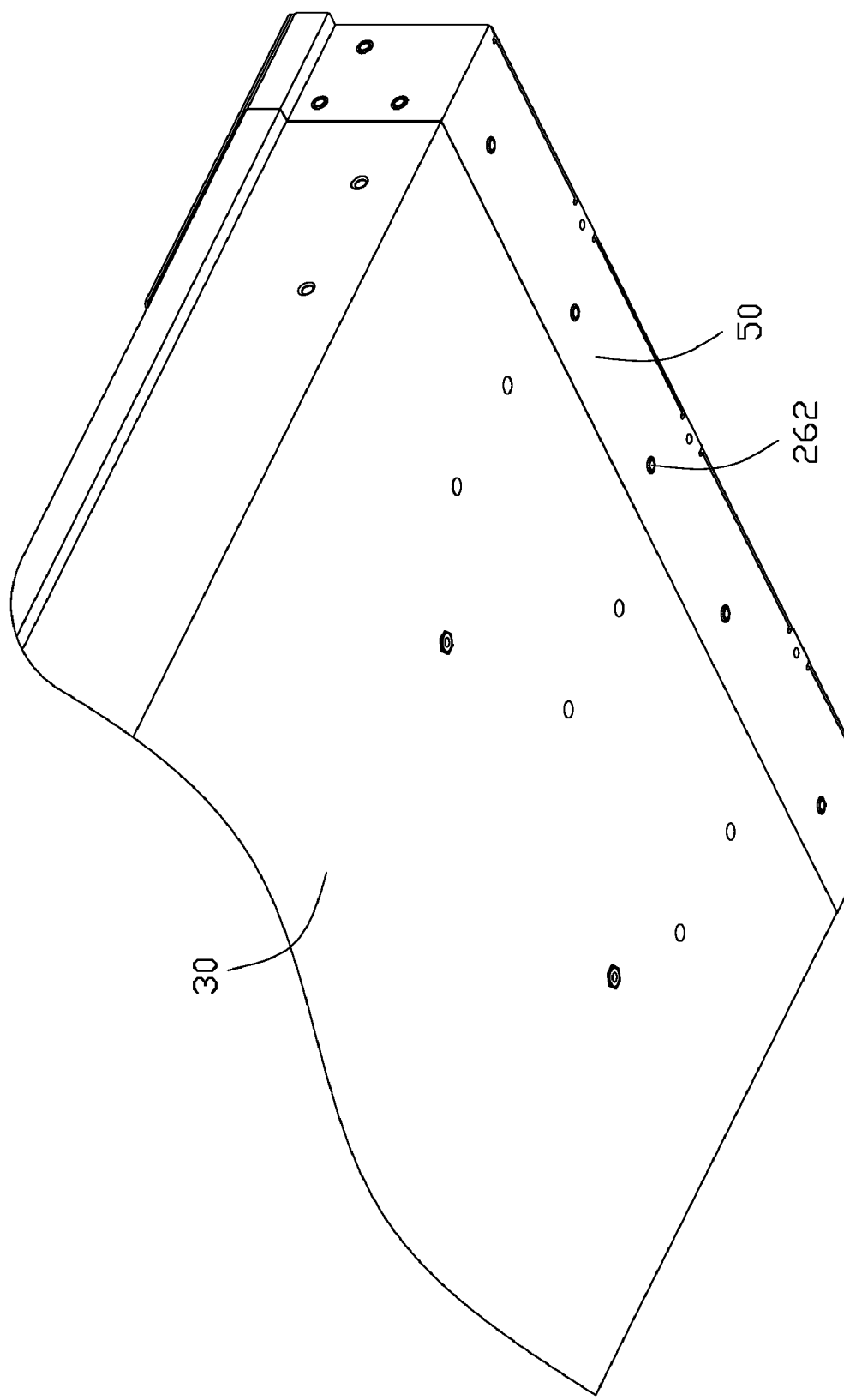
FIG. 2 is an isometric view of the computer enclosure of FIG. 1, but from a different aspect.
Figure 3:
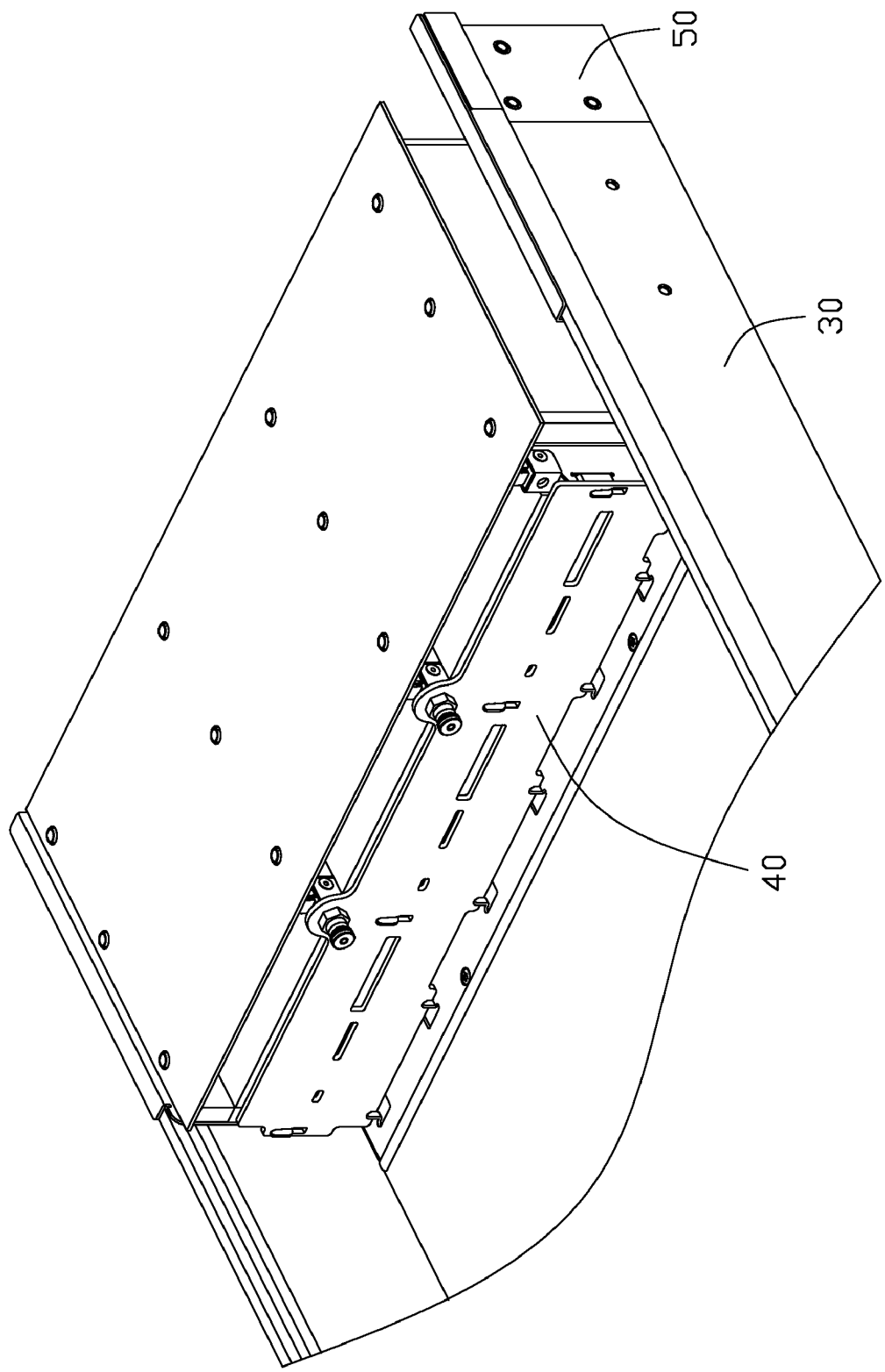
FIG. 3 is an assembled view of the computer enclosure of FIG. 1.

Referring to FIG. 2 and FIG. 3, the disk drive bracket 10 is mounted in the chassis 30. A bottom portion of the printed circuit board 40 is inserted in the grooves 12. Each hook 15 of the disk drive bracket 10 engages with the slot 43 of the printed circuit board 40. The printed circuit board 40 is fixed on the disk drive bracket 10 by inserting the screws 42 through the holes 14, 41. The printed circuit board 40 is mounted on the disk drive bracket 10. The protrusions 311 of the chassis 30 engage with holes (not shown) of the disk drive bracket 10. The holes 321 of the chassis 30 are aligned with the holes 131 of the disk drive bracket 10.

A bulge 262 of the disk drive bracket 10 is inserted in the recess 53 of the extending plate 50 (shown in FIG. 2). The rivet 132 of the disk drive bracket 10 is inserted into the hole 54 of the extending plate 50. The extending plate 50 is fixed on the disk drive bracket 10 prior to mounting the disk drive bracket 10 in the computer enclosure.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure for mounting a disk drive bracket, the computer enclosure comprising:
   a chassis for receiving the disk drive bracket; and
   an extending plate being releasably positioned and aligned at an end of the chassis, wherein a first portion of the disk drive bracket is fixed to the chassis, and a second portion of the disk drive bracket is fixed to the extending plate, such that the disk drive bracket is completely mounted in the chassis and the extending plate.

2. The computer enclosure of claim 1, wherein a thickness of the extending plate is substantially equal to a thickness of the chassis.

3. The computer enclosure of claim 1, wherein the chassis comprises two sidewalls; the extending plate comprises two side panels; each side panel has a height equal to a height of the sidewalls.

4. The computer enclosure of claim 1, wherein a bottom area of the disk drive bracket not mounted in the chassis is substantially equal to a bottom area of the extending plate.

5. A computer comprising:
   a chassis;
   a disk drive bracket being positioned within the chassis such that a portion of the disk drive bracket extends beyond the chassis;
   an extending plate being aligned with an end of the chassis for receiving the portion of the disk drive bracket; a first portion of the disk drive bracket is fixed to the chassis, and a second portion of the disk drive bracket is fixed to the extending plate
   wherein a recess is defined in the extending plate, and a bulge is located on the disk drive bracket to engage with the recess.

6. The computer enclosure of claim 5, wherein a thickness of the extending plate is equal to a thickness of the chassis.

7. The computer enclosure of claim 5, wherein the chassis comprises two sidewalls;
   the extending plate comprises two side panels; each side panel has a height equal to a height of the sidewalls.

8. The computer enclosure of claim 5, wherein a bottom area of the disk drive bracket not mounted in the chassis is substantially equal to a bottom area of the extending plate.

9. The computer enclosure of claim 1, wherein a recess is defined in the extending plate, and a bulge is located on disk drive bracket to engage with the recess.

10. The computer enclosure of claim 1, wherein a printed circuit board is fixed on the disk drive bracket.

11. The computer enclosure of claim 10, wherein a hook is formed on the disk drive bracket, and a slot is defined in the printed circuit board to receive the hook.

12. The computer enclosure of claim 10, wherein the printed circuit board has a screw, and a hole is defined in the disk drive bracket to receive the screw.

13. The computer enclosure of claim 5, wherein a printed circuit board is fixed on the disk drive bracket.

14. The computer enclosure of claim 13, wherein a hook is formed on the disk drive bracket, and a slot is defined in the printed circuit board to receive the hook.

15. The computer enclosure of claim 13, wherein the printed circuit board has a screw, and a hole is defined in the disk drive bracket to receive the screw.

* * * * *